United States Patent [19]
Thorne, III et al.

[11] Patent Number: 5,805,165
[45] Date of Patent: Sep. 8, 1998

[54] METHOD OF SELECTING A DISPLAYED CONTROL ITEM

[75] Inventors: Edwin Thorne, III, Seattle; Patrick Michael Volk, Kirkland, both of Wash.

[73] Assignee: Microsoft Corporation, Redmond, Wash.

[21] Appl. No.: 521,963

[22] Filed: Aug. 31, 1995

[51] Int. Cl.⁶ .................................................... G06F 15/00
[52] U.S. Cl. ............................................................ 345/348
[58] Field of Search ...................... 395/333, 332, 395/348; 345/333, 332, 348, 339, 347, 349

[56] References Cited

U.S. PATENT DOCUMENTS

| | | | |
|---|---|---|---|
| 5,107,443 | 4/1992 | Smith et al. | 395/158 |
| 5,307,457 | 4/1994 | Beitel et al. | 395/161 |
| 5,388,203 | 2/1995 | Kaneko | 395/159 |

*Primary Examiner*—Phu K. Nguyen
*Attorney, Agent, or Firm*—Jones & Askew

[57] ABSTRACT

A method that enables focus to be given to a displayed control item when a cursor is positioned within a predetermining activating area outside of the outer edges of the displayed control item. More particularly, the computer-implemented method for selecting a displayed control item on a display screen which includes the steps of: displaying a cursor on the display screen; displaying a control item on the display screen; providing an area extending around the control menu item; and providing focus to the control item when the cursor is positioned within the area extending around the control item. Preferably, the area extending around the control item is not visible on the display screen. With respect to the dimensions of the area extending around the control item, the dimensions preferably are (height H+constant C1) by (length L+constant C2), where H is the dimension defining the height of the control item and L is the dimension defining the length of the control item. If control items have overlapping activation zones, a weighting scheme is used to select the appropriate control item.

22 Claims, 10 Drawing Sheets

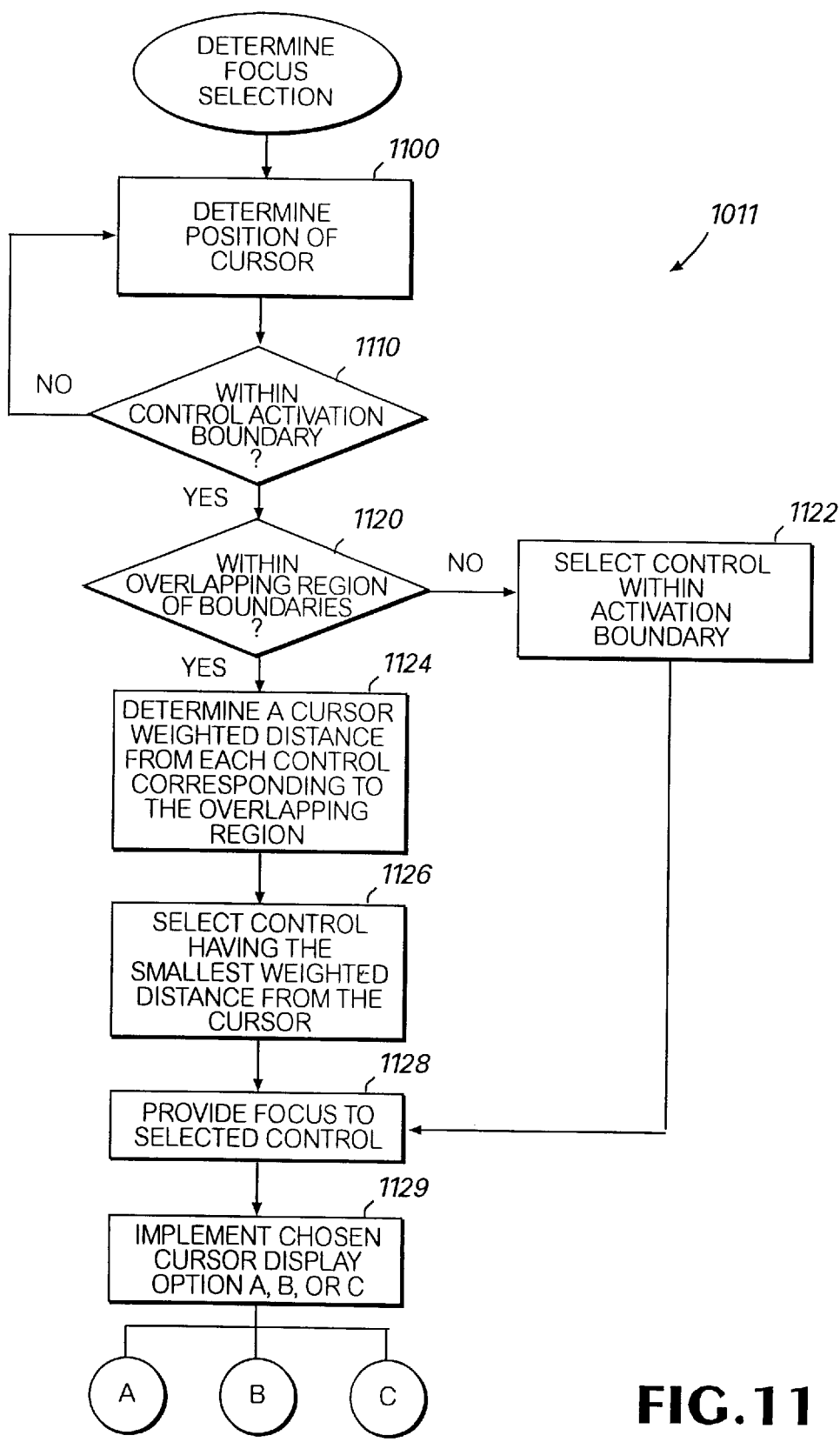

METHOD OF SELECTING A DISPLAYED CONTROL ITEM

FIELD OF THE INVENTION

The present invention relates to a method of selecting a displayed menu item and, more particularly, to a method of providing focus to a display menu item when a cursor is positioned in a predefined area around the display menu item.

BACKGROUND OF THE INVENTION

Cable television systems, sometimes referred to as community-antenna television (CATV) systems, are broadband communications networks of coaxial cable and optical fiber that distribute video, audio, and data signals to the homes or businesses of subscribers. In a typical CATV system, a single advantageously located antenna array feeding a cable network supplies each individual subscriber with a usable television signal.

CATV networks have experienced enormous growth and expansion in the United States, particularly in urban areas. It is estimated that CATV networks currently pass near and are accessible to approximately 90% of the population in the United States, with approximately 60–65% of all households actually being connected to such communications networks. While cable systems originally had very simple architectures and provided a limited number of different television signals, the increase in the number of television broadcasters, owners, and services over the last several decades has resulted in much more complex modern cable distribution systems.

A typical CATV system for the delivery of television programming to subscribers comprises three main elements: a headend, a distribution system, and subscriber drops.

The "headend" is a signal reception and processing center that collects, organizes and distributes signals. The headend receives satellite-delivered video and audio programming, over-the-air broadcast television station signals, and network feeds delivered by terrestrial microwave and other communication systems. In addition, headends may inject local broadcast programming into the package of signals sent to subscribers, such as commercials and live programs created in a television studio.

The "distribution system" carries the signals from the headend to a number of distribution points in a community and, in turn, distributes the these signals to individual neighborhoods for delivery to subscribers. A modern distribution system typically comprises a combination of coaxial cable and optical fibers with trunk amplifiers periodically spaced to compensate for attenuation of the signals along the line.

"Subscriber drops" are taps in the distribution system that feed individual coaxial cable lines into subscribers' television sets or subscriber set-top terminals, often referred to as "subscriber premises equipment" or "customer premises equipment" ("CPE").

CATV distribution systems were originally designed to distribute television signals in the "downstream" direction only, i.e., from a central headend location to multiple subscriber locations, also referred to as the "forward" path. For downstream transmissions, typical CATV systems provide a series of video channels, each 6 MHz in bandwidth. As optical fiber more deeply penetrates the service areas with hybrid optical fiber/coaxial cable (HFC) configurations, the bandwidth of the coaxial cable portion is expected to increase to over 1 GHz, thereby increasing the number of available channels for potential services.

The advent of pay-per-view services and other interactive television applications has fueled the development of bi-directional or "two-way" cable systems that also provide for the transmission of signals from the subscriber locations back to the headend via an "upstream" direction or a "reverse" path. By upgrading CATV systems employing relatively limited bandwidth coaxial cable with broadband distribution networks having HFC configurations, multiple service operators (MSOs) can use the additional channels gained by this wider bandwidth network to provide many new subscriber services. This ever-expanding deployment of fiber optic technology supports the implementation of an "interactive network" to allow a subscriber to obtain desirable service of programming at a time and date specified by the subscriber. Indeed, it is feasible that this interactive network will have sufficient bandwidth to supply hundreds of channels of programming information, thereby leading to an explosion of program options available to subscribers. Potential subscriber services supported by this interactive network include Movies on Demand (MOD) or Video on Demand (VOD), interactive computing, shopping, entertainment, and other related services.

The delivery of a variety of interactive services via a broadband network distribution system raises the critical issue of defining an efficient mechanism for presenting both operation and program-related information to an audience of possible consumers representing diverse technological backgrounds and interests. From an ergonomic perspective, this "user interface" for such an interactive network should appeal to a "typical" viewer of standard broadcast television programs and should be easy for this viewer to understand and to use. Because computer users reflect only a portion of the overall audience for interactive services, it is desirable that the features of this user interface to be based upon the assumption that the typical viewer is not familiar with user interface customs that are otherwise acceptable and understood by the computer literate community. In addition, the functions of the user interface should be controllable with a control device familiar with this typical television viewer, such as a handheld remote control. This user interface also should be readily readable from an acceptable viewing distance that typically separates the viewer from a television screen.

From a technical perspective, the delivery of video signals for presentation by a conventional television screen is limited by the display screen variations in the numerous models of televisions and the limitations inherent in the National Television Systems Committee (NTSC) standards for formatting video signals. The NTSC has established title and video safety standards to define a space along the television screen for readable text and images. The area of the television screen that is considered to support the most reliable presentation of images, which is known as the "safe title" area, is approximately the center 80% of the horizontal and vertical space of a television screen. Likewise, the area of the television screen that is considered to support the most reliable presentation of moving images, which is known as the "safe action" area, is approximately the center 90% of the horizontal and vertical space of a television screen.

Because these NTSC standards suggest that the video performance of even modern television monitors suffer from horizontal and vertical drift problems, the user interface for an interactive network should support the video safety standards to ensure that objects intended for display are actually presented to the viewer. However, it will appreciated that this implementation also effectively reduces "usable screen space" or display resolution for the user interface.

Because in an interactive system the user will make selections based on controls or instructions provided on the television screen, the method of selection of these controls, with a handheld remote control device, should be user friendly. The method of selection should also be designed for the special concerns associated with displaying information on a television screen as compared with a conventional display screen used with personal computers. As in many computer-controlled displays, the positioning of a cursor provides the selection method for designating a desired control. The term "cursor" as used herein includes any form of movable marker, such as a pointer, blinking line, or the like. However, the control or movement of a cursor in an interactive television environment may not be as precise or sophisticated as can be achieved with a general pointing device, such as a mouse used with conventional personal computers. Thus, cursor control or positioning can be problematic in an interactive television environment. Also, due to space limitations, when numerous controls or objects are displayed on a screen, the controls may be close together or small in relation to the screen. In this case, positioning a cursor on a displayed control can be problematic, especially when the selection is being made from across the room by a viewer with less than perfect eyesight.

Thus, there is a need in the art for a user interface having simplified user interface controls that are optimized for the television environment in both appearance and behavior and for a method of improving selection of menu or control items presented on computer-controlled displays.

SUMMARY OF THE INVENTION

Generally described, the present invention provides a method that enables focus to be given to a displayed control item when a cursor is positioned within a predetermined activating area outside of the outer edges of the displayed control item.

More particularly, the computer-implemented method of the present invention for selecting a displayed control item includes the steps of: displaying a cursor on the display screen; displaying a control item on the display screen; providing an activating area extending around the control item; and providing focus to the control item when the cursor is positioned within the activating area extending around the control item. Preferably, the activating area extending around the control item is not visible on the display screen.

With respect to the dimensions of the activating area extending around the control item, the dimensions preferably are (height H+constant C3) by (length L+constant C4), where H is the dimension defining the height of the control item and L is the dimension defining the length of the control item, and C3 and C4 are positive constant values. Thus, the activating area is preferably greater than and encompasses the area of the control item. Also, the pointing device used to direct the cursor within the activating area is preferably a remote control device.

When focus is provided to a control item several options for displaying the cursor may be provided. In one display method, the position of the cursor is automatically moved to the edge of the control item when the cursor is positioned within the activating area extending around the control item. In a second display method, the cursor disappears from the display screen when the cursor is positioned within the activating area extending around the control item (i.e., when the control item is activated to receive focus). In a third display method, the cursor remains visible and the position of the cursor remains at the position at which the user positioned the cursor within the activating area extending around the control item.

In addition to the control item discussed above, a second control item may be provided. The method of the present invention further includes displaying a second control item within a second activating area extending around the second control item. The second activating area is operable for providing focus to the second control item when the cursor is positioned within the second area. In this embodiment, the first and second activating areas extending around the control items may partially intersect, thereby forming an overlapping area. When the cursor is positioned within the overlapping area, the present invention calculates a first weighted value based on the location of the cursor with respect to the first control item and calculates a second weighted value based on the location of the cursor with respect to the second control item.

After calculating the weighted values, the present invention selects the first control item or the second control item for providing focus to either of the control items based on the first and second weighted values. Preferably, the first control item is selected when the first weighted value indicates that the cursor is positioned closer to the first control item than to the second control item, or the second control item is selected when the second weighted value indicates that the cursor is positioned closer to the second control item than to the first control item.

Thus, it is an object of the present invention to provide an enhanced method of selecting control items displayed on a display screen.

It is another object of the present invention to provide focus to a displayed control item when a cursor is positioned within an area extending around the control item.

It is another object of the present invention to provide a method of selecting one of a plurality of control items when a cursor is positioned within overlapping areas extending around the control items that are operative to provide focus to either of the control items.

It is another object of the present invention to provide multiple display options for displaying the cursor when focus has been provided to a control item.

These and other objects, features, and advantages of the present invention will become apparent from reading the following description in conjunction with the accompanying drawings.

BRIEF DESCRIPTION OF THE DRAWINGS

FIGS. 11, 11A–11C are flow diagrams that illustrate the steps implemented in the preferred embodiment of the present invention.

DETAILED DESCRIPTION

Figure 1:
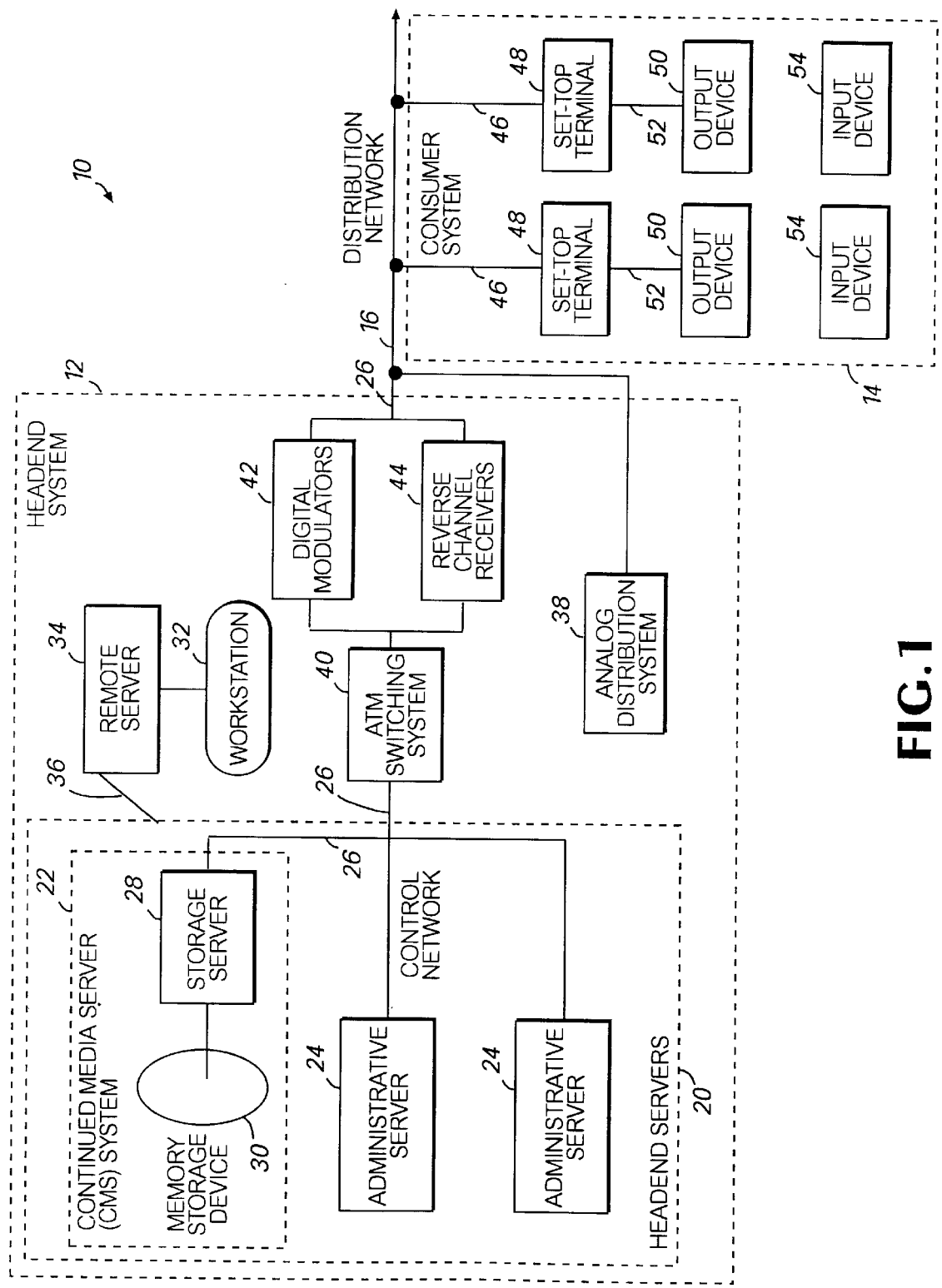
FIG. 1 illustrates the operating environment for an interactive network system.

The preferred embodiment of the present invention is directed to a user interface for an interactive network system that can deliver a variety of services, including entertainment, information, and transaction services, to consumers via an interactive broadband network. This user interface, which is typically presented via an output device, such as a display or monitor, can include one or more control items or images representing various control functions associated with the operation of the interactive network. For example, the user interface can include control items representing functions for controlling a display of available program options. The present invention provides a system for both "highlighting" the currently selected control item and for supplying the user with an indication of other control items that are available for selection by the user. The innovative solution provided by this system addresses the requirements of limited display "real estate" for displaying such control images, as well as the dynamic nature of programming information presented by the interactive network.

Although the preferred embodiment will be generally described as an interactive television system for delivering broadcast television programs and related information, those skilled in the art will recognize that the present invention also can be used to support the delivery of other forms of programming information, including radio, broadcast print, audio, games, computer software, including program modules such as application programs and operating systems, and other combinations of audio, video and/or computer software. Accordingly, it will be understood that programming information generally includes information transmitted electronically to entertain, instruct, educate, or inform the recipient, as well as program modules for supporting these services.

Likewise, those skilled in the art will also appreciate that the present invention can be extended to communicating control information within a computing environment. Specifically, the present invention supports user interfaces for displaying control information with general purpose computer systems, including desktop computers, portable computers, and handheld computers, including personal digital administrators.

The detailed description which follows is presented largely in terms of processes and symbolic representations of operations of data bits manipulated by a processing unit and maintained within data structures supplied by one or more memory storage devices. Such data structures impose a physical organization upon the collection of data bits stored within computer memory and represent specific electrical or magnetic elements. These process descriptions and symbolic representations are the means used by those skilled in the art of computer programming and computer construction to most effectively convey teachings and discoveries to others skilled in the art.

For the purposes of this discussion, a "process" is generally conceived to be a sequence of computer-executed steps leading to a desired result. These machine-implemented steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to these physical quantities that exist within the computer.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Turning now to the drawings, in which like numerals indicate like elements throughout the several figures, FIG. 1 illustrates the operating environment for an interactive network system. Referring to FIG. 1, the interactive network system 10 includes a headend system 12 for delivering programming information to and receiving instructions from a consumer system 14 via a "two-way" distribution network 16. The headend system 12 is the control center for collecting, organizing, and distributing the signals for interactive network operations and the source for programming information. The distribution network 16 transports signals carrying programming information and instructions between the headend system 12 and the consumer system 14. The distribution network 16 can include a world-wide public asynchronous transfer mode (ATM) compatible network with links to the Internet, third party service providers, and other wired and wireless communications networks. The consumer system 14 includes the equipment required for a consumer to receive programming information directly at his or her office or residence and to transmit requests and instructions to the headend system 12.

The headend system 12 can include a set of headend servers 20, including a continuous media server (CMS) system 22 and one or more administrative servers 24, to support various network functions, and a control network 26 linking these headend servers. The headend servers 20 can execute program modules, including service and application program software, to support the transmission of programming information and the reception of requests for such programming information.

It will be appreciated that the headend servers 20 are not necessarily located in one physical location, but can be linked by wired and/or wireless communications paths supplied by the control network. The control network 26 can be a local area network, a wide area network, or a combination of both types of networks. For the preferred embodiment, the control network 26 is implemented as an ATM-based network for routing digital data between the headend servers 20 and the distribution network 16.

The CMS system 22 is a server-based file storage and delivery system that can manage on-demand access to stored digitized data. On-demand access of digitized data is a particularly desirable characteristic of the CMS system 22 if the interactive network supports the delivery of Video on Demand (VOD) or Movies on Demand (MOD) services. The preferred CMS system 22 can supply digital data streams at a constant rate to numerous consumers of the consumer system 14.

The CMS system 22 includes one or more storage servers 28, which operate to retrieve and to transmit the digitized data as required by clients of the CMS system, i.e., the equipment of the consumer system 14. The digitized data, which typically comprises programming information, is maintained on one or more memory storage devices 30 connected to the storage servers 28. Each memory storage device 30 can be implemented as a SCSI hard disk drive, an optical storage system, or any other similar mass storage media. By spreading the data management operations across a group of storage servers and memory storage devices, user load can be balanced with the limited disk, network, and input/output (I/O) resources of the headend system. This also supports fault tolerance by replicating digitized data within the CMS system 22 to survive the failure of a storage server or a memory storage device.

To support the tasks of updating or revising programming information stored on a memory storage device 30 of the CMS system 22, a computer workstation 32 and a remote server 34 can be connected to the control network 26 via a communications link 36. This communications link allows a program distributor or supplier, which typically operates at a location remote from the CMS system 22, to transmit programming information for storage by one or more of the memory storage devices 30 and eventual distribution to consumers via the headend system 12. The communications link 36 can be implemented by either a wireless or wired communications system. For example, the communications link 36 can be constructed as a microwave link or as a conventional telephone link.

The administrative servers 24 of the headend system 12 can support a variety of services and applications associated with the interactive network system 10, including network security, monitoring, object storage, financial transactions, data management, and other administrative functions. The administrative servers 24 also handle the interactive service requests or instructions transmitted via the consumer system 14 by consumers. For an application involving a large base of consumers, an administrative server 24 is preferably dedicated to a particular service or function. For example, one or more servers can handle all consumer authorization requirements, whereas other servers can handle network management services, and so forth. These administrative servers preferably support the Simple Network Management Protocol (SNMP) to enable end-to-end network administration and monitoring.

The headend system 12 also can support the distribution of programming information and other services via an analog distribution system 38 that is coupled to the distribution network 16. This distribution of analog formatted signals can be handled by a separate headend system associated with a community antenna television (CATV) system. The headend of the CATV system typically supports satellite-delivered video and audio programs, over-the-air broadcast television station signals, and broadcast network signal feeds delivered by microwave and other communications systems.

The distribution network 16 is a two-way communications network that connects the headend system 12 to various community distribution points of the consumer system 14 and, in turn, to individual neighborhood nodes for delivery to consumers of services supplied by the interactive network system 10. The distribution network 16 comprises one or more downstream channels supporting transmissions from the headend system to the consumer system and one or more upstream channels for carrying transmissions from the consumer system to the headend system. This bi-directional communications network supports delivery of programming information via the headend system 12 to each consumer and the delivery of requests for programming information by a consumer to the headend system 12. The distribution network 16 can be implemented by a microwave distribution system, a telephone system, coaxial cables, optical fibers, or any combination of these delivery systems. However, the preferred distribution network is implemented by a combination of hybrid optical fiber/coaxial cable (HFC) and optical fiber-to-the-curb (FTTC).

Those persons skilled in the art will appreciate that the programming information delivered over the distribution network 16 typically comprises both video and audio signals. Programming information can be delivered in digital format, analog format, or a combination of both analog and digital formats. For the preferred embodiment, television-related programming is delivered as a stream of digital video and/or audio signals in a compressed digital data stream, including conventional MPEG-1 and MPEG-2 compressed video streams. Likewise, requests or instructions issued by consumers via the consumer system 14 are preferably formatted as digital signals.

The CMS system 22 and the administrative servers 24 are connected to the distribution network 16 via an ATM switching system 40. The ATM switching system 40 supports network switching requirements for delivery by the headend system 12 of digital data streams carrying multimedia content and the handling of interactive service requests from consumers.

Because the interactive network 10 is a two-way communications system, the ATM switching system 40 preferably connects to the distribution network 16 via modulation/demodulation devices. The downstream channels of the distribution network 16 can be connected to the ATM switching system 40 via digital modulators 42, whereas the reverse channels of the distribution network 16 are connected to reverse channel receivers 44.

Each consumer within a neighborhood node of the consumer system 14 is connected to the distribution network 16 via a subscriber drop cable 46, which is typically part of a local cable network administered by a multiple service operator (MSO). The drop cable 46 is typically a coaxial cable or optical fiber connected to a set-top terminal 48 or set-top box located at the consumer's location. This combination of the drop cable 46 and the set-top terminal 48 operates as a "tap" into the distribution network 16, and allows the consumer to (1) receive program modules and programming information distributed by the headend system 12 and to (2) transmit requests or instructions to the headend system 12. For example, the set-top terminal 48 can accept and convert signals carrying programming information to a format compatible for presentation by an output device 50, such as a television or a computer system. This output device 50, which can connected to the set-top terminal via a conductive path 52 such as coaxial cable, preferably includes a receiver and a display or monitor for receiving and displaying programs and program-related information. Those skilled in the art will understand that the output device 50 can be implemented as a combination of separate components, such as a receiver and a monitor, or as a single component, such as a conventional television or a general purpose computer system.

Selected operating functions of the set-top terminal 48 can be controlled by an input device 54 capable of supplying input data to the set-top terminal 48. The input device 54 can be used to transmit command signals to the set-top terminal 48 and to input character-based data, such as text, for processing by the set-top terminal 48. For example, the input device 54 can be used to control the position of a display object presented by the output device or to enter text for conducting a service-related transaction supported by the interactive network 10. The input device 54 can be implemented as one or more devices for inputting data, including a handheld control, a keyboard, a mouse device, a game control, a joystick, a pen or stylus, a trackball, or a track pad.

For the preferred embodiment, the input device 54 is implemented as a handheld remote control capable of transmitting infrared signals carrying commands for controlling the operation of the set-top terminal 48. The remote control can include a directional keypad having distinct keys for allowing the user to control direction (up, down, left, right, and diagonal directions) and relative changes in volume or channel (increase or decrease), as well as absolute changes to channel value via a numeric key pad. The remote control and its functions are more fully described with respect to FIG. 3.

Figure 2:
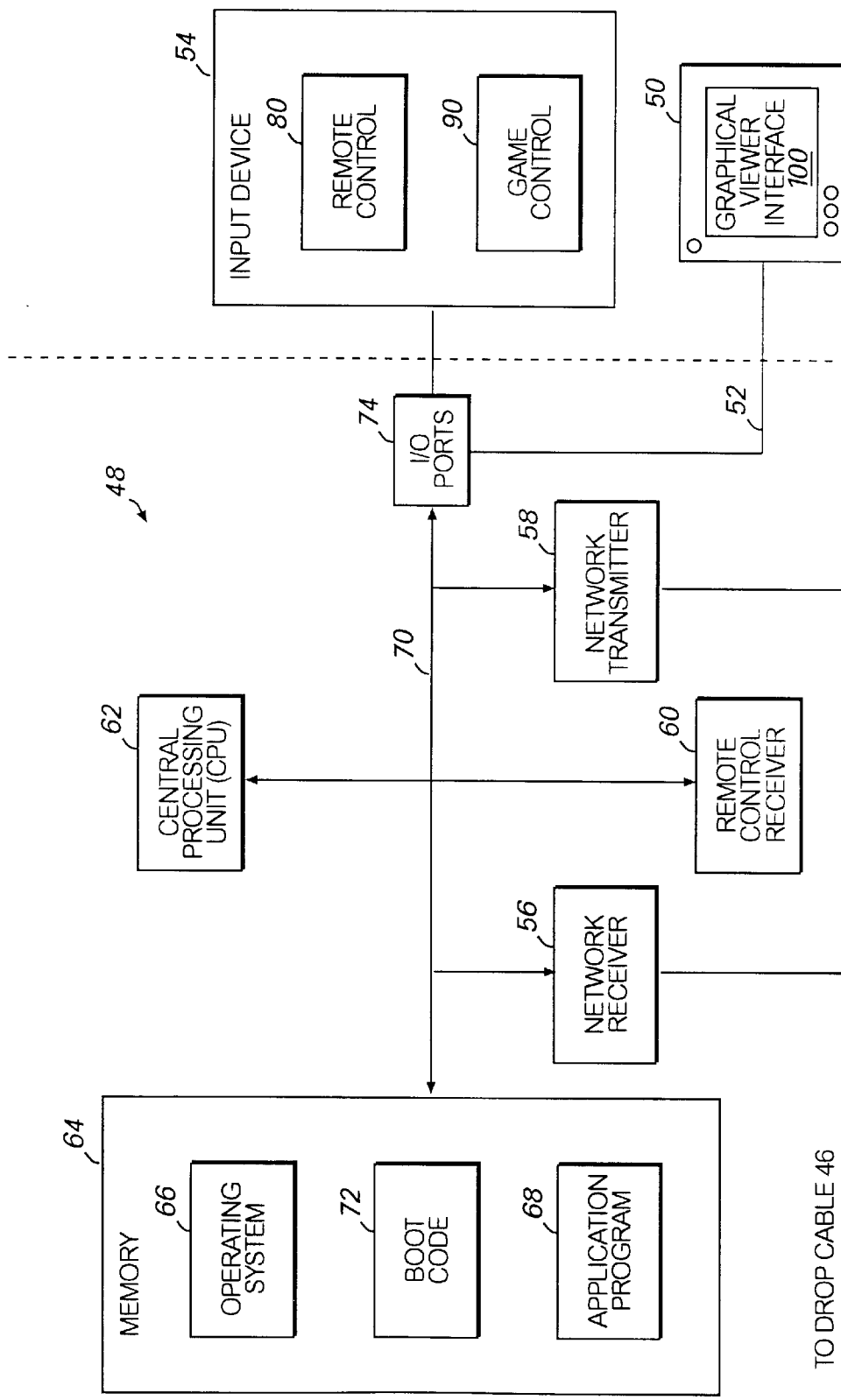
FIG. 2 illustrates the basic components of a set-top terminal.

FIG. 2 illustrates the basic components of the set-top terminal 48. Turning now to FIGS. 1 and 2, the primary components for the set-top terminal 48 include a network receiver 56, a network transmitter 58, a remote control receiver 60, a central processing unit (CPU) 62, and memory 64. These components are connected by a system bus 70, which can carry control, address, and data signals. The network receiver 56 conducts tuning operations for receiving a selected channel of the interactive network 10 and decoding operations for decoding compressed digitized data supplied via the interactive network 10. For example, the set-top terminal 48 can include MPEG decoding capability for converting the compressed digitized data into standard National Television Standard Committee (NTSC) video signals for reception by a conventional television. The network transmitter 58 transmits requests for programming information and related instructions for processing by the headend system 12. The network receiver 56 and the network transmitter 58 can be connected to the distribution network 16 via the drop cable 30. The remote control receiver 60, which may generally be implemented as an infrared receiving device or other wireless device using radio frequency controls, can decode signals carrying the commands issued by the input device 54, such as a remote control 80.

The CPU 62, which is connected to the network receiver and transmitter 56 and 58, as well as to the remote control receiver 60, controls the operations of the set-top terminal 48 and supports the rendering of graphical images of the user interface. The CPU 62 is typically implemented by at least one microprocessor, such as the model 80486 or the "PENTIUM" microprocessor, manufactured by Intel Corporation, Santa Clara, Calif. The CPU 62 communicates, by means of control, address, and data signals, with the remaining components of the set-top terminal 48 through the system bus 70. The CPU 62 operates in conjunction with the operating system 66 to retrieve, process, store, and display data. It will be appreciated that the processing functions of the CPU 62 may be divided among two or more microprocessors to support the presentation of a graphics-intensive user interface. For example, a microprocessor may be dedicated to control operations associated with the bi-directional communications with the headend system 12, whereas another microprocessor may be dedicated to the generation of graphics.

The memory 64, which is connected to the CPU 62, is useful for storing one or more program modules and data associated with set-top terminal operations. Program modules stored in the memory 64 can include an operating system 66 and one or more application programs 68. The memory 64 can be implemented as a combination of dynamic memory, such as random access memory (RAM), and static memory, such as read only memory (ROM).

The operating system 66 comprises a set of computer programs that control the internal functions of the set-top terminal and support the execution of other program modules, including application programs 68. The preferred operating system 66 supports a graphics-based presentation of program-related information, including control items that visually represent control functions of the operating system and other program modules. A control item is any visual image that can be manipulated by the user to perform an operation. The operating system 66 can receive and interpret input data supplied by the input device 54, as received by the remote control receiver 60. As will be described in more detail below, a user can "select" and "launch" control items by the use of the input device 54 in a manner similar to the computer arts.

For the preferred set-top terminal 48, the memory includes a ROM containing at least a portion of program module representing "boot code" 72 for initializing the operations of the set-top terminal 48. Upon power-up of the set-top terminal 48, the boot code 72 initiates a request for the headend system 12 to download certain program modules, including the operating system 66 and one or more application programs 68. The program modules can be stored within the memory 64 of the set-top terminal 48. This downloading process allows the headend system 12 to easily update the program modules used in set-top terminals 48 throughout the interactive network 10. For example, the application programs 68 may be maintained within the set-top terminal 48 only during actual use of the features of these programs; otherwise, these application programs are maintained at the headend system 12. Thus, it will be appreciated that the preferred set-top terminal 48 relies heavily upon data storage mechanisms located at the headend system 12 rather than within the set-top terminal 48 itself.

The set-top terminal 48 can be connected to a peripheral device via input/output (I/O) ports 74. The I/O ports 74 supports the connection of the system bus 70 to a connected peripheral device. For example, the output device 50 can be connected to the I/O ports 74 via a conductor 52. Likewise, an input device 54, such as a game control 90, can be connected to the I/O ports 74. In contrast to the remote control 80, which communicates with the remote control receiver 60 via a wireless communications link, other types of input devices 54 are typically connected to the I/O ports 74 via a cable. Nevertheless, those skilled in the art will appreciate that input devices 54 can communicate with the set-top terminal 48 by use of either wireless or wired communications links.

Generally, when a user first powers-up a set-top terminal 48, the set-top terminal 48 contacts the headend system 12 and requests the downloading of certain program modules, including the operating system 66. In response to loading these program modules, the set-top terminal 48 enters a stand-by mode to limit power consumption and awaits a command signal initiated by a user pressing a key or button on an input device 54, such as a remote control 80. In this stand-by mode, the set-top terminal can communicate with the headend system and can respond to administrative requests transmitted by the headend system 12. In the event that a user tunes to an interactive channel (typically by pressing the appropriate function key of the remote control), the set-top terminal 48 changes modes and enters the active mode. In the active mode, the set-top terminal 48 communicates with the headend system 12 to process the instructions transmitted by the remote control. For example, the set-top terminal 48 responds to a command requesting programming information by forwarding this instruction to the headend system 12 via the drop cable 46 and the distribution network 16. The headend system 12 responds by retrieving selected programming information from the CMS system 22 and transmitting the selected programming information via the return path provided by the distribution network 16 and the drop cable 46. The set-top terminal then supplies this programming information in the proper format for presentation by the display.

Figure 3:
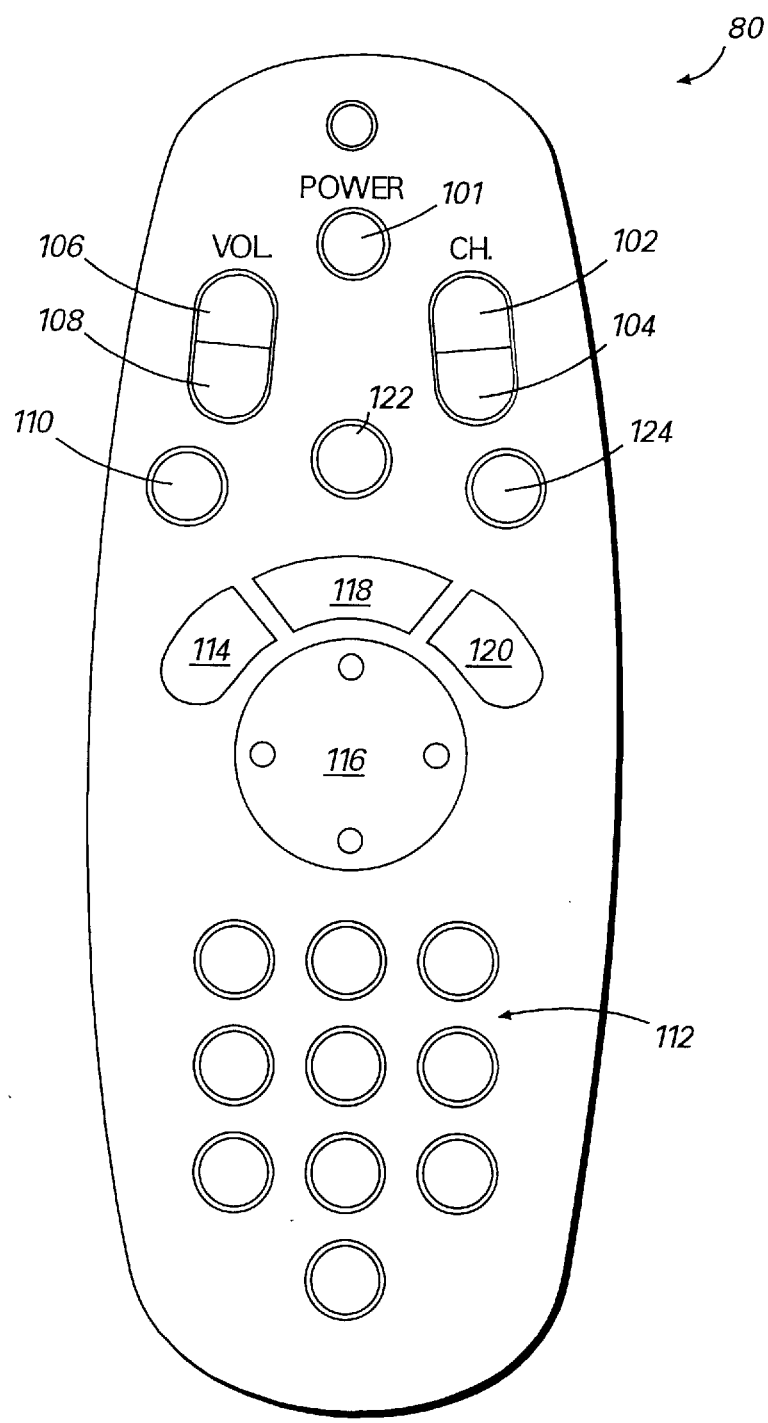
FIG. 3 illustrates the preferred remote control unit, which is used to transmit commands to the set-top terminal.

FIG. 3 illustrates the preferred remote control unit 80, which is used to transmit commands to the set-top terminal 48. The remote control unit 80 includes a variety of keys that are common to remote control units for use with conventional television sets. These include power on/off 101, channel up 102, channel down 104, volume up 106, volume down 108, mute 110, and a 10 digit numeric keypad 112.

The preferred remote control unit also includes keys that are specifically related to preferred interactive system. A menu button 114 is used to open and close on-screen menus, such as a channel manager object. A directional control 116 is a rocker switch that is used to manipulate the channel manager and select specific items by moving a cursor up, down, left or right. An action button 118 is used to launch a selected function. A help key 120 is to initiate on-screen help. An "A" button 122 and "B" button 124 are used to select specific options that are provided in some contexts.

Having discussed the physical environment of the interactive system, the operations and methods of the present invention will be discussed. As noted above, to invoke or launch an option represented by a control or selection item presented on a to display screen, the user positions a cursor on the desired item to be selected and actuates a selection mechanism, such as a control switch or action button, to choose the desired option or function represented by the control item. By actuating the selection mechanism, the user directs the computer program of the operating system to execute the desired option or function. However, as discussed above, television entertainment systems generally do not use a precise or sophisticated pointing device, such as those controlled by a mouse, for a directional control device. Instead, a directional control device 116 is frequently a joy stick or a simple four-directional control device. As a result, positioning the cursor on the desired option or control item can be a difficult process for a user. For example, it is not uncommon for the user to over-shoot or under-shoot the desired control item presented on the display screen.

Figure 4:
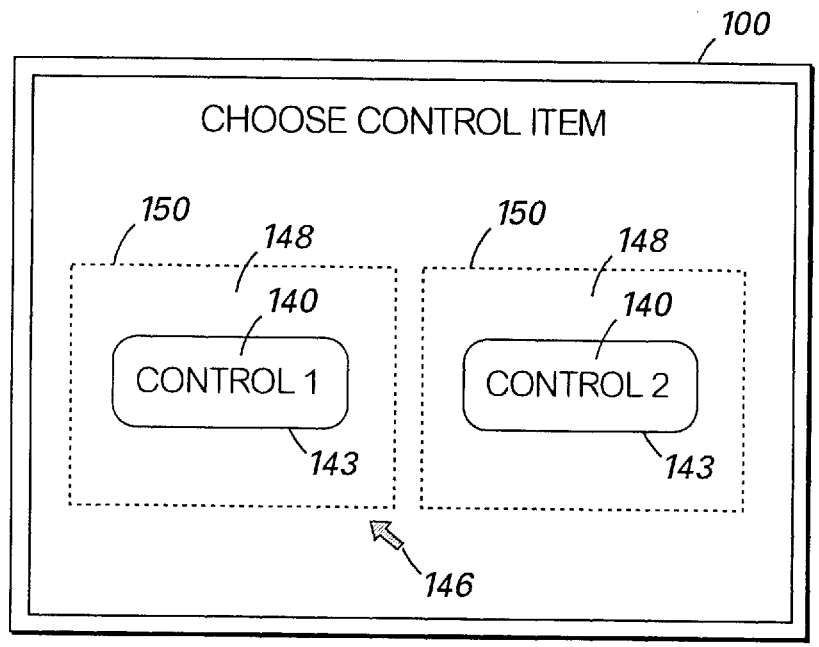
FIG. 4 illustrates control items utilized in the present invention.

The present invention provides a method that facilitates the selection of option or control items presented on a display screen. Referring to FIG. 4, the display screen 100 is shown displaying control items 140 labeled as control 1 and control 2. Control 1 and control 2 are defined on the display screen 100 by boundaries 143. It should be appreciated that any number of control items may be displayed on the display screen 100 as screen space permits. As noted above, the positioning of a cursor, such as cursor 146, directly on a control item 140 may be difficult due to the distance between the user of the remote control 80 and the display screen 100. Also, positioning may be difficult due to the precision of maneuverability of the directional control device 116.

Figure 5:
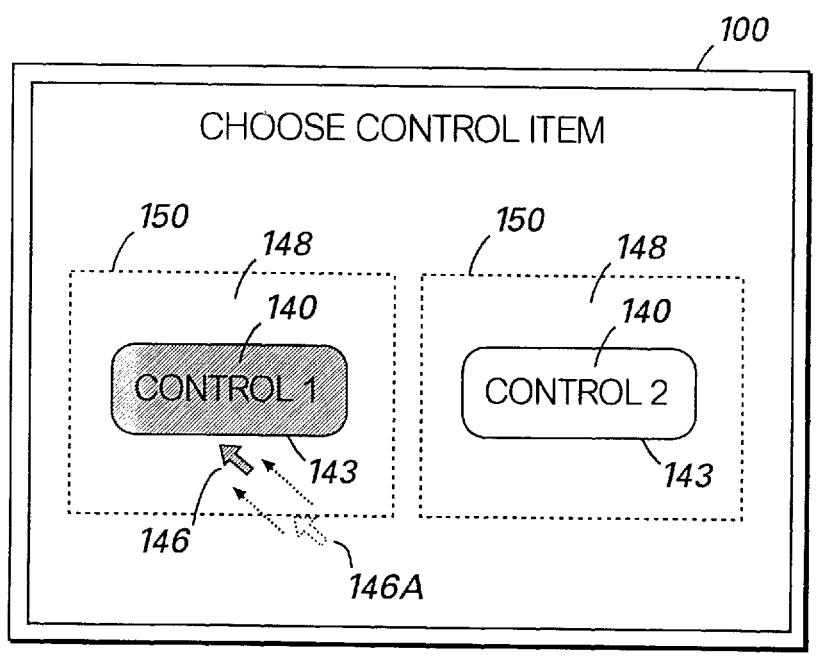
FIG. 5 illustrates a method of displaying a cursor in the present invention when focus is given to a control item.

To enable selection of the displayed option or control items 140, the present invention provides control activation ("gravity") zones 148. The control activation zones 148 are defined by boundaries 150 that extend outwardly from the displayed control items 140. Preferably, the activation zones 148 are the same color and/or pattern as the surrounding background of the display screen 100, and thus are not generally visible on the display screen 100. The activation zones 148 are operable in helping to alleviate cursor maneuverability problems associated with some directional control devices, such as the difficulty of positioning the cursor directly on a displayed control item 140. Conventionally, a cursor must be directly placed on a displayed control item, within boundary 143, in order for the control to be highlighted or given focus. When a control is highlighted, this signals to a user that the depression and/or release of the selection mechanism will invoke the function provided by the control. However, in the preferred embodiment of the present invention, when a cursor comes in contact with or is guided within the boundaries 150 of the activation zone 148, the control is highlighted or given focus as illustrated in FIG. 5. As known to those skilled in the art, the cursor position on a display screen is tracked by a focus manager program of the operating system which enables the present invention to determine whether the cursor 146 is within an activation zone 148.

FIG. 5 shows a cursor 146 that has been positioned within the activation zone boundary 150 and thus has caused focus to be given to control 1. By providing the activation zone 148, focus may be given to the displayed control 1 although the user has not precisely placed the cursor 146 on the control. Thus, focus may be "picked up" in an extended activation area around a control rather than requiring direct placement within the boundaries that typically define a control in a conventional computer-controlled environment. This enables the user to indicate a selection without precision placement of a cursor from across a room to designate a small target. It should be appreciated that the size and dimensions of the activation zones 148 may vary to suite the particular application. Additionally, when many controls are placed on a display screen 100, providing a fully visible selection area around multiple controls may cause the display screen 100 to appear cluttered. However, in implementing the present invention, the twofold benefit of enabling less than precise placement of the cursor to indicate a selection and the benefit of providing a less cluttered display screen are provided because part of the activating focus area may not be visible.

In the embodiment of the present invention illustrated in FIG. 5, when the cursor 146 is guided to a position 146A that is slightly inside of the activation zone 148, focus is "pulled" to or gravitates to control 1, hence the activation zone 148 may also be referred to as a "gravity" zone 148. As shown, control 1 becomes highlighted when the cursor 146 is positioned in the activation zone 148. In the embodiment illustrated in FIG. 5, when the cursor 146 as shown in FIG. 4 is guided to position 146A, the cursor visibly moves to the location of the cursor 146 shown in FIG. 5, which is at the displayed location of the control 1. In this embodiment, the cursor 146 moves independent of user control when the user stops movement of the cursor within the activation zone 148. Note that the activation zone 148 preferably does not cause any movement of the cursor while the cursor 146 is under user control to prevent "jerky" movements of the cursor that would be caused if the user control had to move the cursor 146 in opposition to the attraction provided by the activation zone 148.

Figure 6:
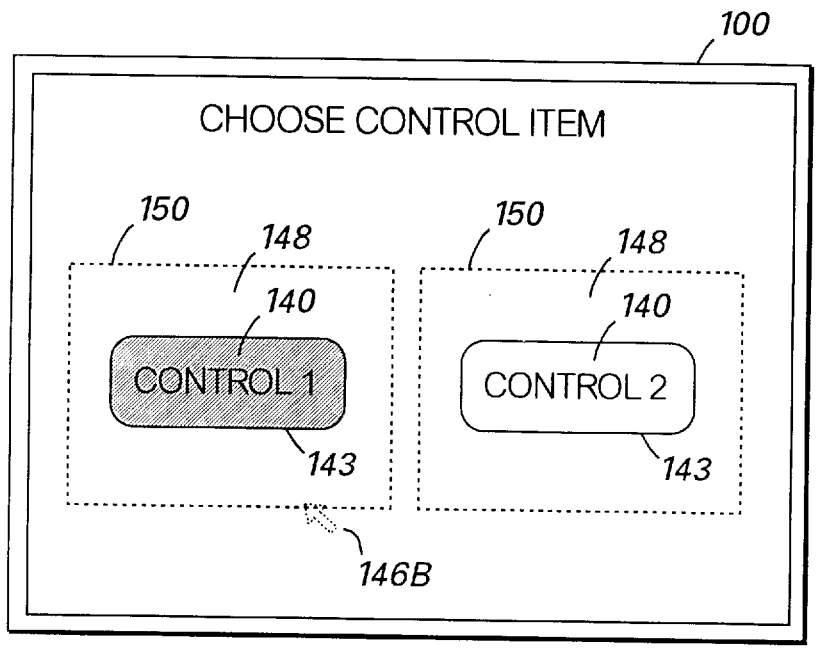
FIG. 6 illustrates another method of displaying a cursor in the present invention when focus is given to a control item.

Referring to FIG. 6, another embodiment of the present invention is shown. In FIG. 6, when the cursor 146 as shown in FIG. 4 is guided to position 146B, which is inside the activation zone 148, the cursor is hidden on the display screen 100 as shown. As shown, control 1 becomes highlighted when the cursor 146 is positioned in the activation zone 148. In this embodiment, the cursor does not move independent of user control when the user stops movement of the cursor 146 within the activation zone 148, but instead, the cursor 146 is made to be invisible on the display screen 100 at the point where the user stopped movement of the cursor, and the control is given focus as discussed above.

Figure 7:
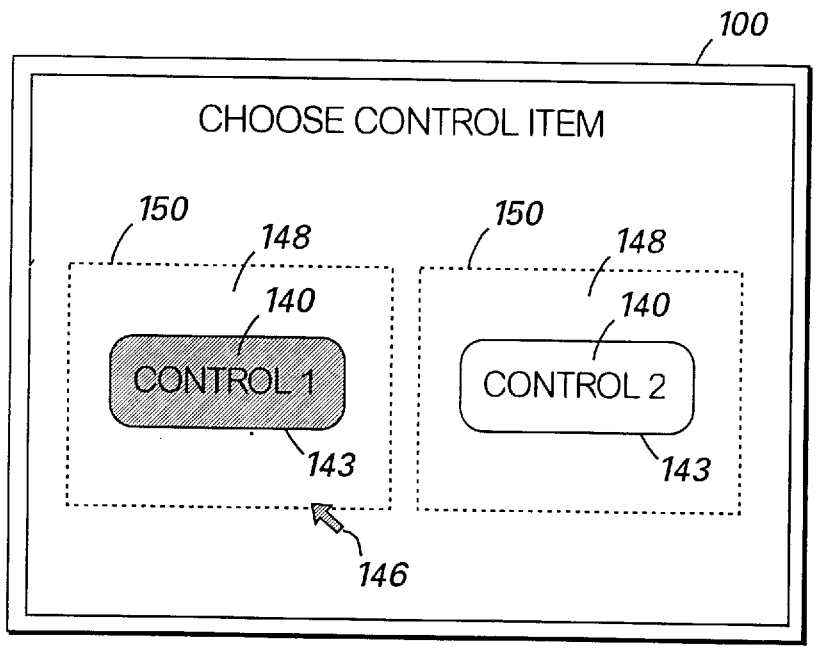
FIG. 7 illustrates another method of displaying a cursor in the present invention when focus is given to a control item.

In the embodiment of the present invention illustrated in FIG. 7, when the cursor 146 is guided to a position that is slightly inside of the activation zone 148, focus is "pulled" to or gravitates to control 1. Focus may be indicated at control 1 as the cursor 146 passes through the activation zone 148 or focus can remain at the control which most recently attained focus until the cursor 146 is stopped at which time the appropriate control will be provided as discussed herein. As shown, control 1 becomes highlighted when the cursor 146 is positioned in the activation zone 148. In the embodiment illustrated in FIG. 7, when the cursor 146 is guided to a position inside the activation zone 148, the cursor 146 remains at the position inside the activation zone 148 where the user stopped movement of the cursor 146. In this embodiment, the cursor does not move independent of user control when the user stops movement of the cursor within the activation zone 148.

Figure 8:
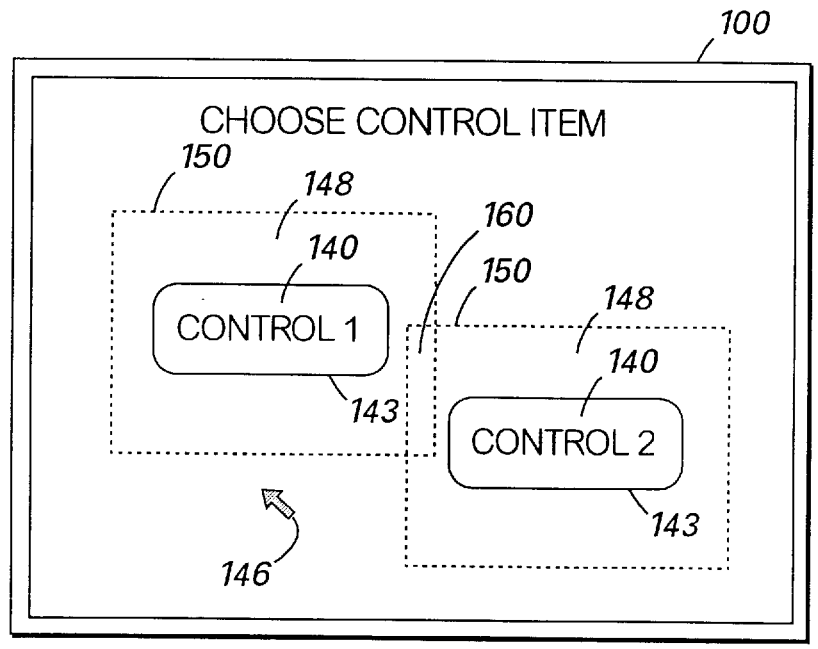
FIG. 8 illustrates control items having overlapping activation areas.

Referring to FIG. 8, a further embodiment of the present invention is shown. In FIG. 8, the activation zones 148 are provided around control 1 and control 2 as noted above, however, the activation zones 148 intersect thereby forming an overlapping region 160. When the cursor 146 is guided or directed to a position within the non overlapping section of the activation zones 148, focus is given to the appropriate control as noted above. However, if the cursor 146 is guided into the overlapping region 160, additional steps are performed to determine which control should be given focus.

Figure 8A:
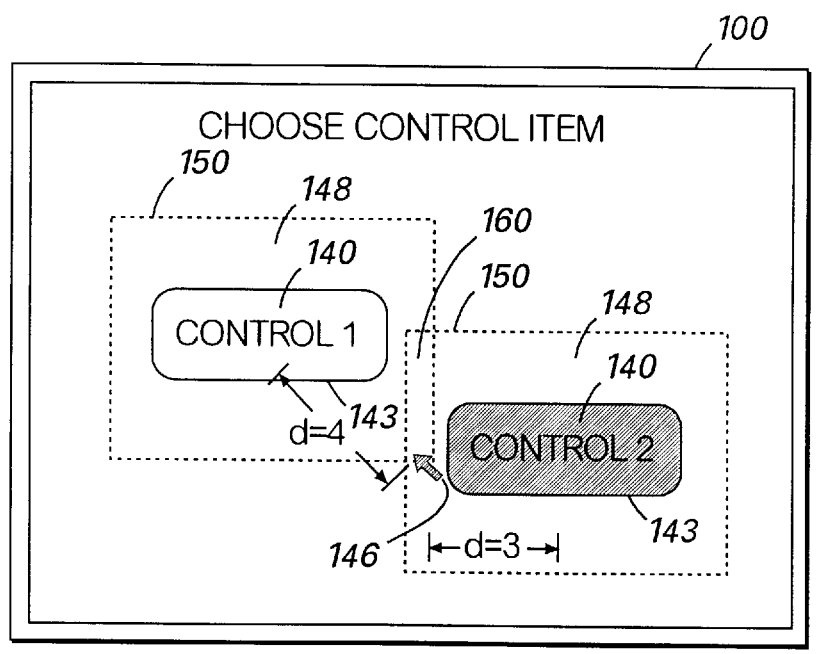
FIG. 8A illustrates the manner of selecting one of control items having overlapping activation areas.

When the cursor 146 is guided into the overlapping region 160, the position of the cursor 146 is determined with respect to each control that has an activation zone 148 corresponding to the overlapping region. In this example, a first weighted value is provided for the cursor 146-control 1 relationship. Also, the position of the cursor 146 is determined with respect to control 2 and a second weighted value is provided for the cursor 146-control 2 relationship. Depending on the selection method utilized, one of the weighted values is selected and the corresponding related control is given focus. Preferably, the control item 140 having its center closest to the cursor position is given focus as shown in FIG. 8A. In FIG. 8A, the distance d between the cursor 146 and the control 2 is calculated as 3 and the distance d between the cursor 146 and the control 1 is calculated as 4. Thus, because cursor 146 is closer to control 2, control 2 is given focus. That is, the control whose center is the shortest distance from the cursor 146 is chosen when the cursor 146 is positioned within overlapping activation zones. A point which represents the center of the control may be programmed and stored in memory as the center of the control from which distance calculations from the cursor 146 may be determined. It should be appreciated that any number of weighting schemes may be utilized for choosing an appropriate control. It should also be appreciated that any of the cursor display embodiments discussed above in connection with FIGS. 4–7 may be utilized with the embodiment illustrated in FIGS. 8 and 8A.

Figure 9:
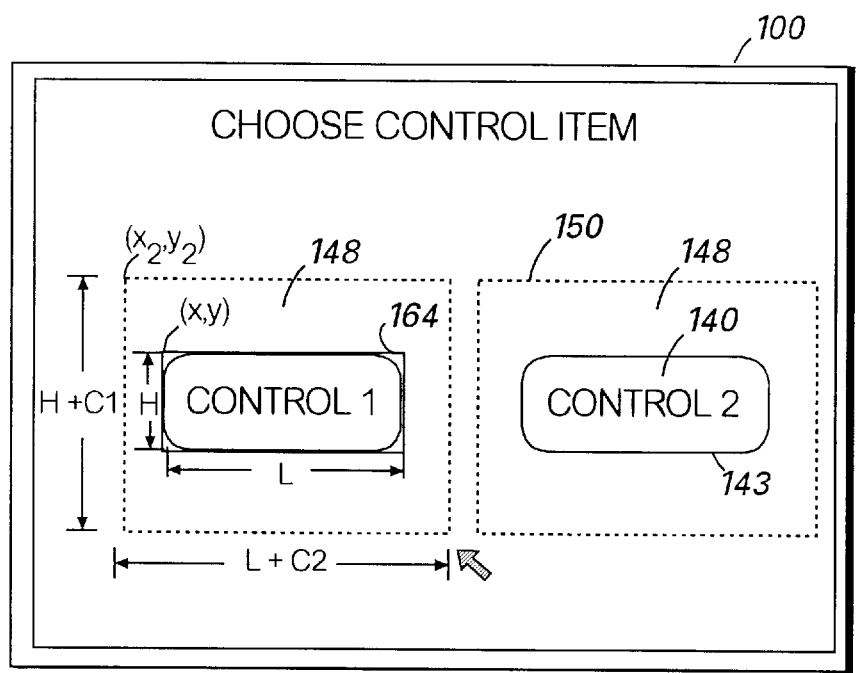
FIG. 9 illustrates the dimensions of a control item and of the activation area extending around the control item.

Referring to FIG. 9, the dimensions of the control items 140 and the activation zones 148 are discussed. As known to those skilled in the art, a display screen may be divided into m by n elements generally known as pixels. A portion of the computer memory 64 is organized as a rectangular array of elements to represent the pixels of the display screen. The pixels as defined by the computer memory 64 may be addressed in terms of Cartesian coordinates (x, y) corresponding to each pixel. More specifically, for each control, the preferred embodiment stores a set of Cartesian coordinates which identifies the upper left-hand corner of the control. A control is defined in the computer system memory by a rectangle which is derived from the given (x, y) coordinates, and a height and width (length) for the rectangle.

To provide an effective area for selection of a control, such as control 1, an extent/size variable is given by a height H and a length L value that are used to form a rectangular shape 164 that defines the control item. The visible control items may be displayed having rounded edges although the control is defined in terms of the rectangular shape 164. The edges of the displayed control on the screen contact the lines defining the rectangle 164 as defined by the height H variable and the length L variable. The activation zones 148 discussed above are preferably created defining coordinates $(x_2, y_2)$ outside the rectangle 164 and then creating an area defined from $(x_2, y_2)$ having height and length dimensions of $H+C_1$ and $L+C_2$, respectively. Those skilled in the art should appreciate that C1 and C2 are constant values that may be selected independently for each control item. Thus, the activation zone 148 encompasses the originally defined control item area as illustrated. The activation zone 148 is then utilized to provide focus to a control when the cursor 146 moves within the boundary 150 defined by the activation zone 148 as discussed above.

Figure 10:
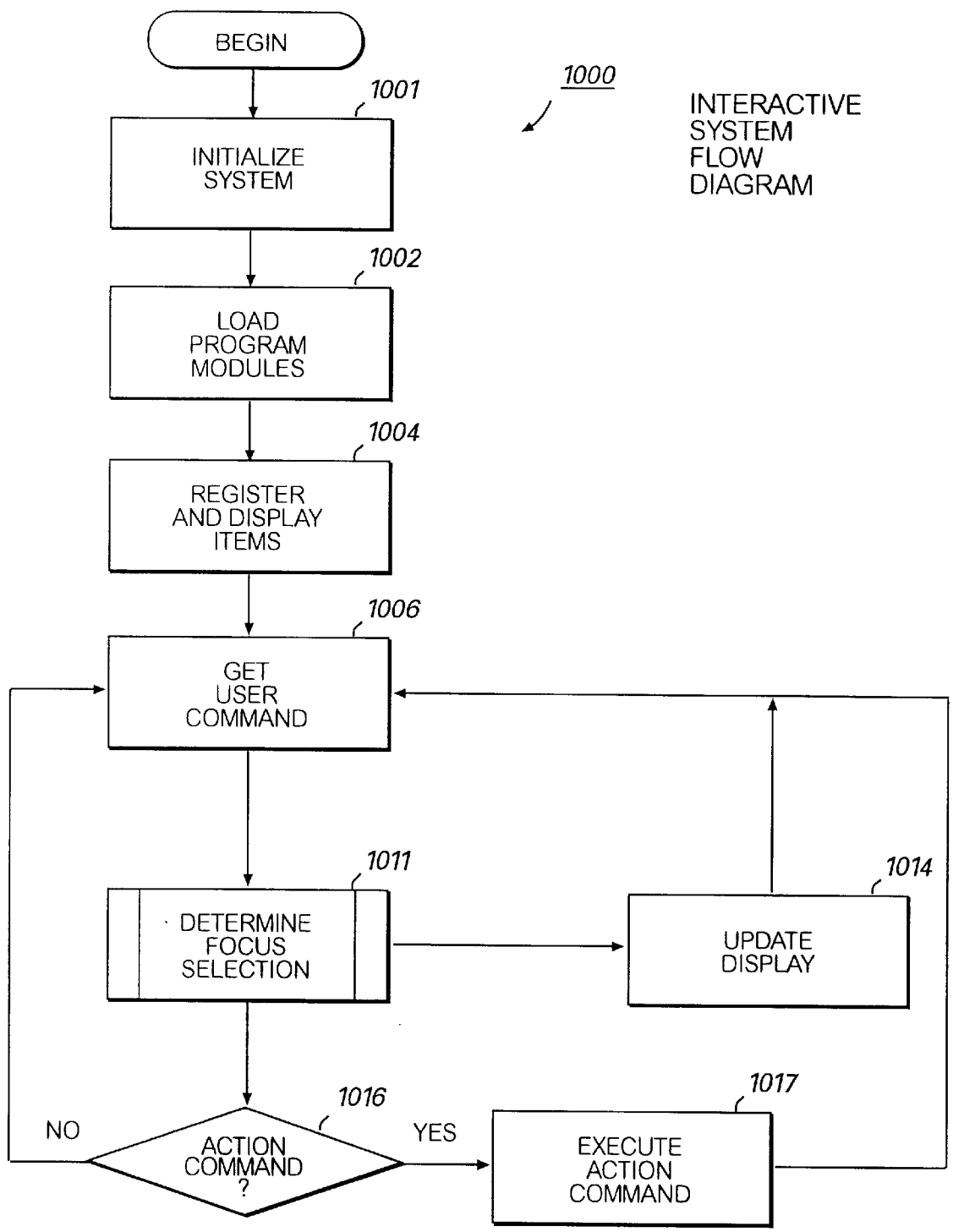
FIG. 10 is a flow diagram that illustrates the steps implemented to provide selection options to a user.

Referring to FIG. 10, a top level logical flow diagram for a computer-implemented process for controlling the items displayed by the graphical user interface on the display screen 100 is shown. Referring to FIGS. 1, 2, 3 and 10, the computer-implemented process or program 1000 begins at step 1001. In step 1001, the set-top terminal 48 is initialized upon system start-up, i.e., when the viewer powers-up the set-top terminal 48. Preferably, initialization of the set-top terminal 48 is conducted by the boot code 72, which is stored in the memory 64 and initiates a request to the headend system 12 to down-load certain program modules, such as the operating system 66 and a "default" application program 68. In step 1002, the program module(s) are received by the set-top terminal 48 via the distribution network 16 and loaded into the memory 64. These program modules typically support the display of associated control and focus items by the display screen 100 on the output device 50. In turn, the viewer can control the operation of the set-top terminal 48 and the operation of the program modules running on the set-top terminal 48 by selecting a desired control item and executing the underlying control function represented by the selected control item.

Upon completion of loading operations, a computer-implemented routine 1004 registers the locations of these program modules, and displays the control items. During the registration process, a program module can call a focus manager and pass information relating to the control items to be displayed via the display screen 100. The positions on display screen 100 of control items are registered with the focus manager. The focus manager as referred to herein is a program module that is responsible for determining and providing focus for control items.

Control items can then be displayed by the display screen 100. Thus, the display screen 100 can present for viewing a combination of control items and a focus item indicating which control item has received initial focus. Focus items are shown in FIGS. 5–7 and 8A.

Figure 11A:
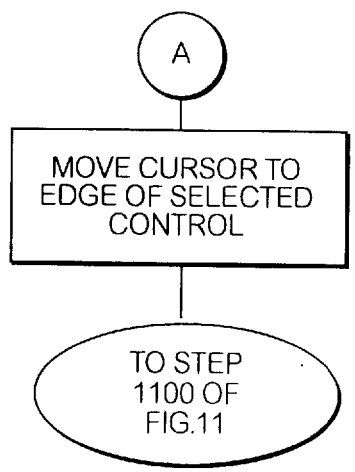
Figure 11B:
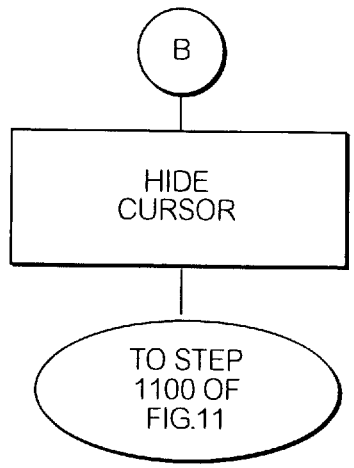
Figure 11C:
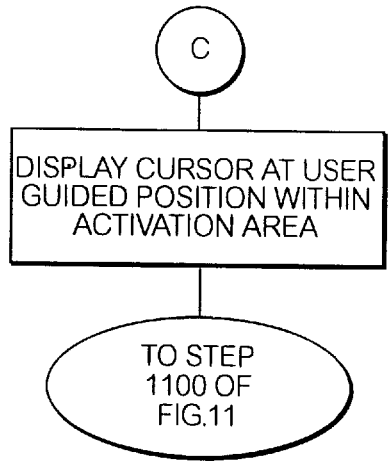

After completing the registration process and presenting an initial display of the graphical viewer interface on the display screen 100, the set-top terminal 48 is now ready to accept a command from the input device 54. In step 1006, the system receives a command signal in response to the viewer's decision to conduct a desired control operation. For many control operations, the remote control 80 can be used to transmit an infrared command signal to the set-top terminal 48. Typical command signals generated by the remote control 80 can include: (1) directional commands for moving the focus between control items or for navigating a cursor within the display screen 100, typically in response to a viewer manipulating the thumbpad 116 on primary remote 80, (2) an action command for initiating the execution of a desired function by a control item, typically in response to a viewer depressing the action key 118 on primary remote 80, (3) conventional television/VCR-related commands, and (4) character-based input data. The command signal generally affects the control item that currently has focus, i.e., the control item designated as having focus as a result of directing focus in association with this control item. The control item which is to receive focus is determined at step 1011 which is discussed in detail in connection with FIG. 11.

Once the control item which is to receive focus has been determined, the screen is updated, at step 1014, showing the selected focus item. The updated display will include a visual cue to highlight the control item having focus. In addition, the updated display may further include a visual indicator of the remaining control items that are available for subsequent selection.

At step 1016, an inquiry is conducted to determine if the command signal output by the input device 54 is an action command, such as the signal that typically is produced by primary remote 80 in response to a viewer depressing the action key 118. An action command can be associated with the activation of a control function associated with the control item having the focus. If an action command has been transmitted, the "YES" branch is followed to step 1017 and the action command is executed. Otherwise, the "NO" branch is followed from step 1016 to step 1006. Because a "terminate" function is not necessarily assigned to a dedicated key on the primary remote control 80, the application program 68 preferably provides the viewer with a mechanism to dismiss or to close this program module.

Those skilled in the art will appreciate that for as long as a program 1000 is activated, it will continually loop through the steps of FIG. 10 to receive and act upon viewer input commands. New programming information loaded into the set-top terminal 48 from the headend system 12 may change the presentation of the control items on the graphical viewer interface, but the focus management program runs continuously servicing the controls that are active.

The preferred steps of the method for providing focus to a displayed control in the computer-controlled environment are shown in FIGS. 11, 11A, 11B, and 11C. As noted above, in the preferred embodiment of the present invention, when the cursor 146 comes in contact with or is guided within the boundaries 150 of the activation zones 148, the appropriate control is highlighted or given focus. The steps of the preferred method are implemented with a computer program operating on a computer-controlled display as discussed above. It will be appreciated that conventional software development techniques are used for developing the computer program for implementing the preferred steps of the present invention. The preferred steps will be discussed in conjunction with FIGS. 4–7.

FIG. 11 shows the process for providing focus to a displayed control when a cursor 146 is positioned within an activation area 148. At step 1100, which can be called on every cursor move or when the cursor movement is stopped, the focus manager of the operating system determines the cursor 146 position. At step 1110, the process determines whether the cursor 146 is positioned within an activation zone 148. If the cursor 146 is not positioned within an activation zone 148, control proceeds to step 1100. If, however, the cursor 146 is positioned within an activation zone 148, at step 1120, the process determines whether the cursor 146 is contained within an overlapping region 160 of two or more activation boundaries as discussed in connection with FIGS. 8 and 8A. If the cursor 146 is not positioned within an overlapping region 160 of two or more activation zones 148, then, at step 1122, the displayed control within the activation zone 148 is selected as the chosen control. The process proceeds to step 1128 where the appropriate control is given focus and the process proceeds to step 1129.

If, however, at step 1120, the process of the present invention determines that the cursor 146 is positioned within an overlapping region 160 of two or more activation boundaries, the process proceeds to step 1124. At step 1124, as discussed in connection with FIGS. 8 and 8A, the position of the cursor 146 is determined with respect to control 1 and a first weighted value is provided for the cursor 146-control 1 relationship. Also, the position of the cursor 146 is determined with respect to control 2 and a second weighted value is provided for the cursor 146-control 2 relationship. The process then proceeds to step 1126 where, preferably, the control having its center closest to the cursor position, based on the weighted values, is determined to be the selected control. At step 1128, the selected control is given focus and the process proceeds to step 1129.

At step 1129, the preselected user or manufacturer cursor display option is implemented. If display option A is implemented, referring to FIG. 11A, the cursor 146 is moved to the displayed edge of the selected control as discussed in connection with FIG. 5. If display option B is implemented, referring to FIG. 11B, the cursor is hidden as discussed in connection with FIG. 6. If display option C is implemented, referring to FIG. 11C, the cursor 146 is displayed at the position within the activation boundary 148 as positioned by the user as discussed in connection with FIG. 7.

The foregoing relates to the preferred embodiment of the present invention, and many changes may be made therein without departing from the scope of the invention as defined by the following claims.

We claim:

1. In a computer controlled system, a method of indicating that a control item on a display screen may be selected by a selection mechanism used in conjunction with a pointing device, comprising the steps of:

displaying a control item within a first boundary visible on said display screen;

defining an activating area outside of said first boundary;

responsive to activation of said pointing device, providing a position signal corresponding to the instantaneous position of a cursor on said display screen; and in response to the position signal being within said activating area, providing an indication of at least said control item that said control item is available for selection by said selection mechanism by assigning focus to said control item.

2. The method of claim 1 wherein said display screen is a television.

3. The method of claim 2 wherein said pointing device is a remote control device.

4. The method of claim 1 wherein the position of said cursor is automatically moved to said first boundary of said control item when said cursor is positioned within said activating area.

5. The method of claim 1 wherein the position of said cursor disappears from said display screen when said cursor is positioned within said activating area.

6. The method of claim 1 wherein the position of said cursor remains at the position at which said pointing device positioned said cursor within said activating area.

7. The method of claim 1 wherein the dimensions defined in said step of defining said activating area are (height H+constant C1) by (length L+constant C2), where H is the dimension defining the height of said control item and L is the dimension defining the length of said control item.

8. In a computer controlled system, a computer-implemented method for selecting a control item displayed on a display screen, comprising the steps of:

displaying a cursor on the display screen;

displaying a control item in a first mode on the display screen;

providing an activating area extending around the control item, said area not being visible on said display screen;

providing a control item focus signal when the cursor is positioned within the activating area extending around the control item; and in response to the control item focus signal, displaying the control item in a second mode indicating that the control item is available for selection.

9. The method of claim 8 wherein the position of said cursor is automatically moved to the edge of said control item when said cursor is positioned within said activating area.

10. The method of claim 8 wherein the position of said cursor disappears from said display screen when said cursor is positioned within said activating area.

11. The method of claim 8 wherein the position of said cursor remains at the position at which said pointing device positioned said cursor within said activating area.

12. The method of claim 8 wherein the dimensions defined in said step of providing said activating area extending around the control item are (height H+constant C1) by (length L+constant C2), where H is the dimension defining the height of said control item and L is the dimension defining the length of said control item.

13. The method of claim 8, wherein the step of displaying the control item in a second mode indicating that the control item is available for selection comprises assigning focus to the control item.

14. In a computer controlled system, a method of indicating that a selection item on a display screen may be selected by a selection mechanism used in conjunction with a pointing device, comprising the steps of:

displaying a first selection item within a first boundary visible on said display screen;

defining a first activating area outside the outer edges of said first boundary, said first activating area operable for highlighting said first selection item when a cursor is positioned within said first activating area;

displaying a second selection item within a second boundary visible on said display screen;

defining a second activating area outside the outer edges of said second boundary, said second activating area operable for highlighting said second selection item when a cursor is positioned within said second activating area;

said first and second activating areas at least partially intersecting, thereby forming an overlapping area;

moving, via said pointing device, said cursor to a location within said overlapping area;

in response to said cursor being positioned within said overlapping area, calculating a first weighted value based on the location of said cursor with respect to said first selection item and calculating a second weighted value based on the location of said cursor with respect to said second selection item; and selecting said first selection item or said second selection item for providing focus to either of said items based on said first and second weighted values.

15. The method of claim 14 wherein said step of selecting comprises selecting said first selection item when said first weighted value indicates that said cursor is positioned closer to said first selection item than to said second selection item or selecting said second selection item when said second weighted value indicates that said cursor is positioned closer to said second selection item than to said first selection item.

16. The method of claim 14 wherein the dimensions defined in said step of defining said first activating area are (height H+a first constant value) by (length L+a second constant value), where H is the dimension defining the height of said first selection item and L is the dimension defining the length of said first selection item.

17. The method of claim 16 wherein the dimensions defined in said step of defining said second activating area are (height H+a third constant value) by (length L+a fourth constant value), where H is the dimension defining the height of said second selection item and L is the dimension defining the length of said second selection item.

18. The method of claim 17 wherein said pointing device is a remote control device.

19. The method of claim 17 wherein said first constant value and said third constant value are equal and wherein said second constant value and said fourth constant value are equal.

20. A method for indicating that a control item is available for selection on a display screen, comprising the steps of:

displaying a control item in a first mode visible on said display screen within a first boundary;

providing an invisible activating area extending around the control item;

detecting a cursor within the invisible activating area;

in response to detecting the cursor within the invisible activating area, displaying the control item in a second mode indicating that the control item is available for selection; and moving the cursor to the first boundary of the control item.

21. The method of claim 20, wherein the step of displaying the control item in a second mode indicating that the control item is available for selection comprises assigning focus to the control item.

22. The method of claim 20, wherein the dimensions defined in the step of providing an invisible activating area are (height H+constant C1) by (length L+constant C2), where H is the dimension defining the height of the control item and L is the dimension defining the length of control item.

* * * * *